United States Patent
Hardage et al.

(10) Patent No.: US 11,073,008 B2
(45) Date of Patent: Jul. 27, 2021

(54) HORIZONTAL LINE DRIVE SELECTIVE SOLUTION MINING METHODS

(71) Applicant: Buffalo Potash Corp., Martensville (CA)

(72) Inventors: Quinton Hardage, Saskatoon (CA); Stephen Philip Halabura, Martensville (CA)

(73) Assignee: Buffalo Potash Corp., Martensville (CA)

( * ) Notice: Subject to any disclaimer, the term of this patent is extended or adjusted under 35 U.S.C. 154(b) by 0 days.

(21) Appl. No.: 16/370,589

(22) Filed: Mar. 29, 2019

(65) Prior Publication Data

US 2019/0368330 A1 Dec. 5, 2019

Related U.S. Application Data

(60) Provisional application No. 62/677,619, filed on May 29, 2018.

(51) Int. Cl.
*E21B 43/28* (2006.01)
*C09K 8/58* (2006.01)
*E21B 43/24* (2006.01)

(52) U.S. Cl.
CPC .............. *E21B 43/283* (2013.01); *C09K 8/58* (2013.01); *E21B 43/2405* (2013.01)

(58) Field of Classification Search
CPC .... E21B 43/283; E21B 43/2405; E21B 43/26; C09K 8/58; C09K 8/66
See application file for complete search history.

(56) References Cited

U.S. PATENT DOCUMENTS

| | | | |
|---|---|---|---|
| 2,910,123 A * | 10/1959 | Elkins | E21B 43/17 166/271 |
| 3,058,729 A | 10/1962 | Dahms et al. | |
| 3,148,000 A | 9/1964 | Bowen et al. | |
| 3,262,741 A | 7/1966 | Priestly et al. | |
| 3,285,350 A * | 11/1966 | Henderson | E21B 7/064 340/853.5 |
| 3,365,278 A | 1/1968 | Kelly et al. | |
| 3,366,419 A | 1/1968 | Pasternak et al. | |
| 3,407,004 A | 10/1968 | Every et al. | |
| 3,433,530 A | 3/1969 | Dahms et al. | |
| 3,779,601 A * | 12/1973 | Beard | E21B 43/2405 299/4 |
| 4,248,838 A | 2/1981 | Allain et al. | |

(Continued)

FOREIGN PATENT DOCUMENTS

CA        838477 A        4/1970

*Primary Examiner* — Brad Harcourt
(74) *Attorney, Agent, or Firm* — Craig J. Lervick; Larkin Hoffman Daly & Lindgren Ltd.

(57) ABSTRACT

Methods for mining soluble minerals from a subterranean deposit. A fluid is injected into a horizontal injection wellbore passing through the deposit and allowed to enter a mining/fracture plane having at least one fracture, extending from the horizontal injection wellbore, at a pressure sufficient to further fracture the deposit, maintain the mining/fracture plane or open the mining/fracture plane. The injected fluid is allowed to dissolve some of the soluble minerals from the deposit thereby forming a mineral solution which is produced from horizontal production wellbores that intersect the mining/fracture plane.

17 Claims, 5 Drawing Sheets

(56) References Cited

U.S. PATENT DOCUMENTS

| | | | |
|---|---|---|---|
| 4,630,868 A * | 12/1986 | Jones | E21B 43/283 |
| | | | 166/250.09 |
| 5,246,273 A | 9/1993 | Rosar | |
| 6,022,080 A | 2/2000 | Grueschow et al. | |
| 8,991,937 B2 | 3/2015 | Haugen | |
| 8,998,345 B2 | 4/2015 | Haugen | |
| 9,540,248 B2 | 1/2017 | Maiti et al. | |
| 9,822,013 B1 | 11/2017 | McEwan et al. | |
| 2010/0012331 A1 * | 1/2010 | Larter | E21B 43/243 |
| | | | 166/401 |
| 2014/0191561 A1 | 7/2014 | Haugen | |
| 2017/0227663 A1 * | 8/2017 | Ma | G01V 1/288 |

* cited by examiner

HORIZONTAL LINE DRIVE SELECTIVE SOLUTION MINING METHODS

CROSS-REFERENCE TO RELATED APPLICATIONS

The present application claims priority to U.S. Provisional Application No. 62/677,619, filed May 29, 2018, which is incorporated herein by reference.

FIELD OF THE INVENTION

The present invention relates to subterranean solution mining, and specifically to solution mining involving creating a mining/fracture plane by fracturing a mineral deposit from a horizontal well and injecting a fluid under pressure into the mining/fracture plane.

BACKGROUND OF THE INVENTION

It is known in the art of mining that solution mining requires boring injection and recovery wells into the ground such that the wells have access to a subterranean mineral deposit. Typically, a solution is injected into the subterranean deposit to dissolve any soluble minerals. The dissolved mineral solution is then pumped out of the ground to the surface and the water may subsequently be evaporated. This differs from conventional mining, which involves sinking a shaft to access a mineral deposit.

It is preferable to employ solution mining methods due to safety and the high capital barrier of conventional mining. It has been found, however, that many conventional solution and selective solution mining methods suffer from drawbacks such as the need to use fresh water to dissolve the salt in the reservoir and create caverns for surface area primary mining. In these methods surface area is needed for mineral dissolution.

SUMMARY OF THE INVENTION

According to a first broad aspect of the present invention, there is provided a method for mining soluble minerals from a subterranean deposit, the method compromising the steps of:
  providing a generally horizontal injection wellbore passing through the deposit;
  fracturing the deposit generally horizontally from the horizontal injection wellbore thereby creating fractures initiating from the horizontal injection wellbore and extending in at least one transverse direction to the horizontal injection wellbore creating a mining/fracture plane, comprising at least one fracture in the plane, extending from the horizontal injection wellbore into the deposit;
  injecting a first fluid into the horizontal injection wellbore and allowing the injected first fluid to enter the mining/fracture plane from the horizontal injection wellbore at a pressure sufficient to fracture a portion of the deposit, maintain the mining/fracture plane or open the mining/fracture plane;
  allowing the injected first fluid to dissolve some of the soluble minerals from the deposit thereby forming a mineral solution;
  providing at least one generally horizontal production wellbore passing through the deposit that is substantially parallel with the horizontal injection wellbore at a location such that the at least one horizontal production wellbore intersects the mining/fracture plane thereby rendering the at least one horizontal production wellbore in fluid communication with the horizontal injection wellbore;
  allowing the mineral solution to flow through the mining/fracture plane and flow into the at least one horizontal production wellbore; and
  producing the mineral solution from the at least one horizontal production wellbore.

According to a second broad aspect of the present invention, there is provided a method for mining soluble minerals from a subterranean deposit, the method compromising the steps of:
  providing a generally horizontal injection wellbore passing through the deposit;
  fracturing the deposit generally horizontally from the horizontal injection wellbore thereby creating fractures initiating from the horizontal injection wellbore and extending in at least one transverse direction to the horizontal injection wellbore creating a mining/fracture plane, comprising at least one fracture in the plane, extending from the horizontal injection wellbore into the deposit;
  injecting a first fluid into the horizontal injection wellbore and allowing the injected first fluid to enter the mining/fracture plane from the horizontal injection wellbore at a pressure sufficient to fracture a portion of the deposit, maintain the mining/fracture plane or open the mining/fracture plane;
  allowing the injected first fluid to flow through the mining/fracture plane and to dissolve some of the soluble minerals from the deposit thereby forming a mineral solution;
  reducing the injection pressure of the first fluid thereby inducing the flow of the mineral solution into the horizontal injection wellbore; and
  producing the mineral solution from the horizontal injection wellbore.

In some exemplary embodiments of the first and second aspects, the at least one transverse direction comprises two generally opposing directions (perpendicular to the wellbore) initiating from the horizontal injection wellbore. It is preferable for some of these embodiments of the first aspect that the at least one horizontal production wellbore comprises two horizontal production wellbores and the horizontal injection wellbore is interposed between the two horizontal production wellbores.

In some exemplary embodiments of the first and second aspects, fractures initiate from a first plurality of positions along the horizontal injection wellbore. The step of fracturing may occur by injecting a second fluid into the horizontal injection wellbore and allowing the injected second fluid to enter the deposit from the first plurality of positions at a pressure sufficient to fracture the deposit. The second fluid may be the same as the first fluid. Preferably, the injected first fluid and/or the second fluid is at a temperature higher than the deposit temperature. The first fluid and/or the second fluid may be pre-heated by non-geothermic, geothermic artificial/mechanical and/or mechanical means. Preferably, the first fluid and/or the second fluid is injected under hydraulic pressure. In some exemplary embodiments of the first and second aspects, the first fluid and/or the second fluid are:
  derived from subterranean sources,
  naturally occurring brackish to saline water,
  refinery plant effluent brine,
  exhausted refinery effluent, from subterranean sources located close to or at the stratum of the embedded soluble minerals,
derived mainly from a subterranean source located under a stratum of the embedded soluble minerals,
derived mainly from a subterranean source located above a stratum of the embedded soluble minerals,
under-saturated salt solution or brine, and/or
recovered brine.

The step of allowing the injected first fluid to enter the mining/fracture plane may occur from a second plurality of positions along the generally horizontal injection wellbore. The first plurality of positions and the second plurality of positions may be the same or substantially the same for such embodiments.

The mining/fracture plane is preferably generally rectangular in shape.

The mineral deposits may contain mainly chloric, nitric and sulphatic minerals, sylvite, or carnallite. Recovered minerals, from the produced mineral solution, may be mainly sylvite. In some exemplary embodiments, the produced mineral solution is substantially saturated with the subterranean minerals.

The method of the first and second aspects may be repeated until a mineral-bearing bed is substantially exhausted as no more mineral material can be economically recovered.

A detailed description of exemplary embodiments of the present invention is given in the following. It is to be understood, however, that the invention is not to be construed as being limited to these embodiments. The exemplary embodiments are directed to a particular application of the present invention, while it will be clear to those skilled in the art that the present invention has applicability beyond the exemplary embodiments set forth herein.

BRIEF DESCRIPTION OF THE DRAWINGS

In the accompanying drawings, which illustrate exemplary embodiments of the present invention.

Exemplary embodiments of the present invention will now be described with reference to the accompanying drawings.

DETAILED DESCRIPTION OF EXEMPLARY EMBODIMENTS

Throughout the following description specific details are set forth in order to provide a more thorough understanding to persons skilled in the art. However, well known elements may not have been shown or described in detail to avoid unnecessarily obscuring the disclosure. The following description of examples of the invention is not intended to be exhaustive or to limit the invention to the precise form of any exemplary embodiment. Accordingly, the description and drawings are to be regarded in an illustrative, rather than a restrictive, sense.

Throughout the following description, the phrase "process brine" should be interpreted to include saline water such as, but not limited to, brackish water, solvent, and saturated sodium chloride solution as would be apparent to a person skilled in the art. Furthermore, the term "solvent" should be interpreted to include a fluid that is capable, due to its particular chemical composition, to dissolve the referred minerals in-situ, for instance sylvite, while not dissolving non-desired minerals, for instance halite.

The present invention is directed to methods for solution mining of subterranean soluble mineral deposits or mineral compounds with the aid of a suitable solvent. The methods of the present invention involve controlled lateral connections (i.e., mining/fracture plane) between generally horizontal wells with multiple injection points. The injection points located within a generally horizontal solvent injection well are used as the basis for multiple-stage fracturing procedures, and horizontal mineralized solution production wells. The wells are arranged in an aligned pattern allowing for, as termed herein, "horizontal line drive selective solution mining" in a manner to control subsidence and dissolve lean and rich soluble mineral deposits or mineral compounds economically from the host rock. The mining of soluble minerals or mineral compounds may be achieved with the aid of a suitable solvent obtained from selected subterranean deposits. Such minerals or mineral compounds that may be mined by the present invention include, but are not limited to, chloric, nitric, sulphatic and potassium chloride (potash) based minerals such as sylvinite/sylvite or carnallite.

In some exemplary embodiments of the present invention, a non-selective solution mining method is carried out by the continuous injection of solvent into a potash stratum. Non-selective solution mining occurs when the injected solvent dissolves a wide array of different minerals within the stratum due to the concentration and make-up of the injected solvent. The amount of injected brine employed, herein referred to as the process brine, may depend on the ore ratio of the mineable deposit and the temperature conditions present in the subsurface environment.

Figure 1:
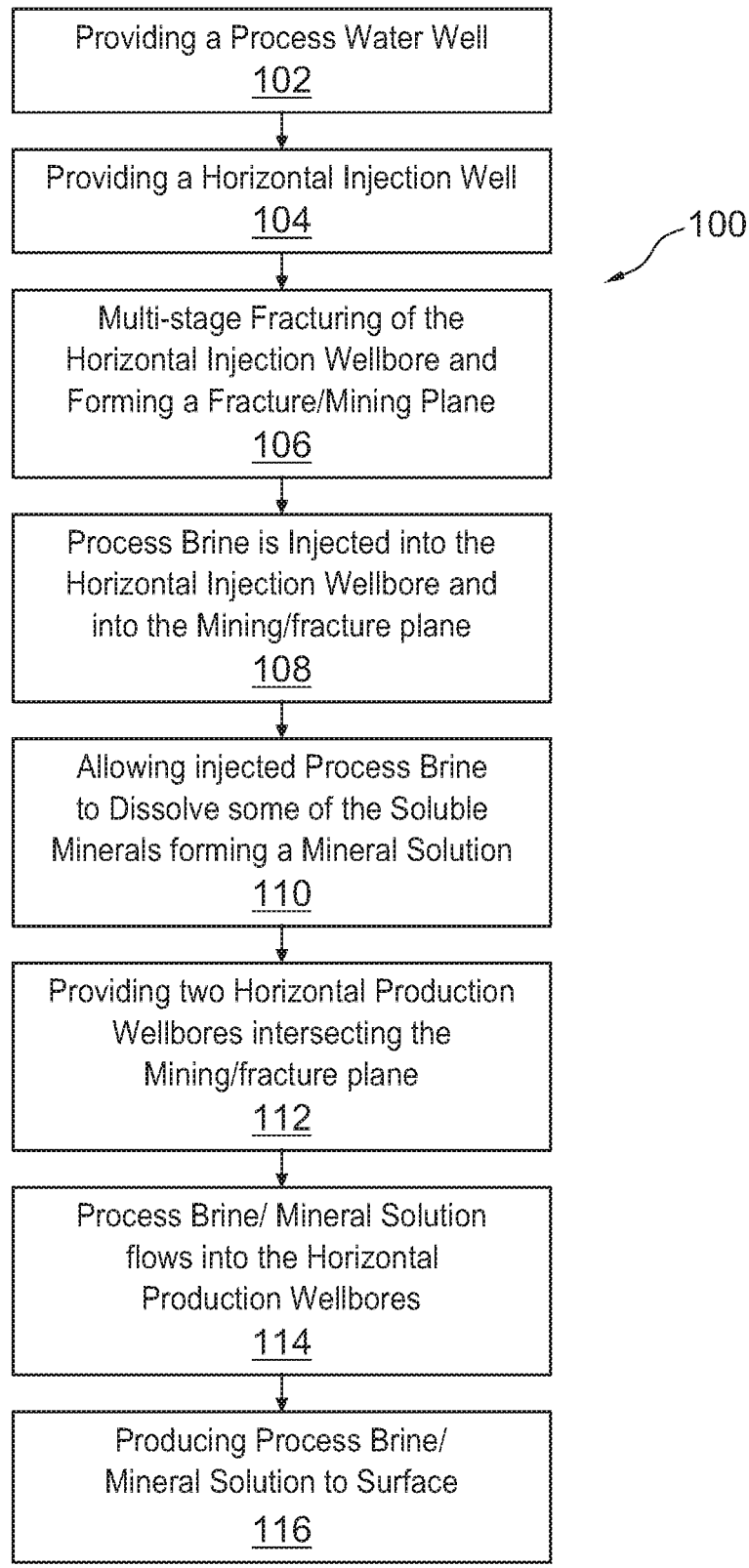
FIG. 1 is a flow chart illustrating a first exemplary method according to the present invention.

Turning now to FIG. 1, a first exemplary method 100 according to the present invention is illustrated by means of a flowchart. In a first step 102 of the first exemplary method 100, process brine wells near a projected mining field are initially drilled to the deepest possible stratum which can produce a sufficient amount of process brine having a suitable geothermic heat content equal to or higher than the geothermic heat contained in the mineral stratum or strata to be mined. In instances when drilling to a sufficient depth level is not practical, the process brine of a lower heat content may be used, and its temperature subsequently raised either by artificial/mechanical means or by heat exchange means with the geothermic environment prevailing in the mineral stratum during the process of curing brine to maturity.

The process brine wells are then perforated and a submersible pump is employed to produce process water. If the stratum appears tighter than expected, a short horizontal leg (100-200 meters) can be drilled to allow for more process brine to be produced.

It is believed that when brine that is approximately 20° C. warmer than the formation temperature is employed as the process brine for the present invention, higher grade potash can selectively be solution mined as heated brine allows sodium chloride to fall out of solution when the brine is saturated with potassium chloride.

After completion of the process brine source well(s), at a near distance to the same, an injection well is provided at step 104 which involves drilling and casing a generally horizontal injection wellbore targeting the lowest strata of the targeted exploitable minerals.

At step 106, process brine is injected into the horizontal injection wellbore thereby causing it to be multi-stage fractured, forming a mining/fracture plane generally horizontally, comprising a series of fractures within the deposit, extending from both sides of the injection wellbore, by employing fracture ports, reservoir ports, packers or burst ports that are spaced at least 10 meters apart along the horizontal injection wellbore. The use of fracture ports, reservoir ports, packers or burst ports for injection from a wellbore is known to those skilled in the art. Proppant may be used, but is not necessary, in the induced multi-stage fractures, to hold open the fractured openings. When proppant is employed, the required injection pressure for holding a fracture open may be reduced. Other products for holding a fracture open that could be employed would be known to those skilled in the art. During multi-stage fracturing along the wellbore, the fracture port, reservoir port, packer or burst port that is furthest from the vertical portion of the wellbore commences fracturing first and then the remaining fractures are completed one after the other, or at the same time, from the toe region to heel region of the horizontal well. The two most common ways to do this are by using a series of packers or fracture ports that are pressure controlled. The fracture is completed at each stage at a pressure higher than the formation fracture pressure and over time (after injecting) that fracture or injection pressure reduces.

An injection pump or a pressure truck may be employed for injecting the process brine and creating the pressure needed in order to create the fracture/mining plane as would be clear to those skilled in the art.

Figure 2A:
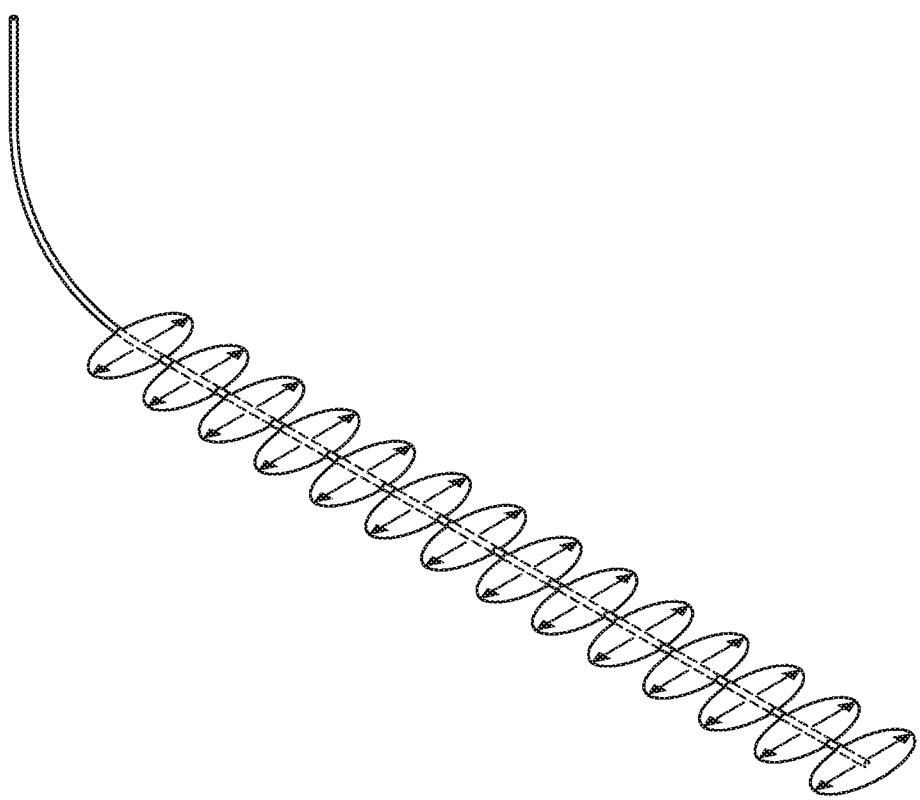
FIG. 2a is a simplified schematic view of a limited-entry zonal isolation system, installed onto a horizontal injection wellbore, using packers for zonal isolation.
Figure 2C:
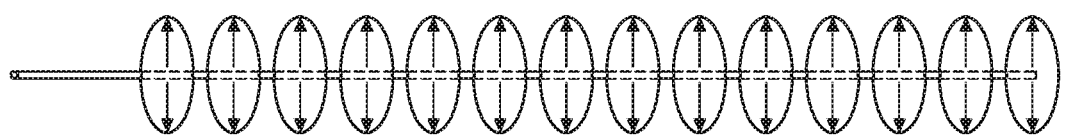
FIG. 2c is a simplified top view of a limited entry zonal isolation system, installed onto a horizontal injection wellbore, using packers for zonal isolation.
Figure 2B:
FIG. 2b is a simplified side view of a limited-entry zonal isolation system, installed onto a horizontal injection wellbore, using packers for zonal isolation.

The injection wellbore is then equipped with a limited-entry zonal isolation system with injection points located at the fracture ports. Limited-entry zonal isolation systems are known to those skilled in the art. FIGS. 2a-2c illustrate an example of a limited-entry zonal isolation system, installed onto a wellbore, using packers for zonal isolation for even lateral fluid distribution. These systems, also referred to as an Injection Control Device (ICD), are employed to ensure essentially equal amounts of process brine are pushed out of each reservoir/fracture port along an entire horizontal injection wellbore at substantially equal pressures. This facilitates the flow from the injector being uniform and front-like allowing for an even distribution of process brine injection within the deposit. These systems are similar to what is used for multi-stage fracturing of petroleum production wells and SAGD injection wells.

Dyed substances blended into the injection solvent along with micro-seismic mapping techniques known to those skilled in the art can be employed to assist in tracking the propagation of the fracture/mining plane from the horizontal injection wellbore. That can assist in the placement and drilling of parallel horizontal production wellbores on both sides of the horizontal injection wellbore and ensure that the horizontal production wellbores intersect the fracture/mining plane on each side of the horizontal injection wellbore.

At step 108, process brine is then injected into the horizontal injection wellbore which then flows through the limited-entry zonal isolation system with a sufficient hydraulic pressure to keep open the mining/fracture plane and establish the petrostatic pressure which is established as the working flow pressure. It is preferable to commence injection just below the richest mineral stratum to take advantage of the eventual tendency of the process brine, by virtue of its lesser density, to rise to the top of the fractured plane and dissolve the preferred minerals from the roof of the mining/fracture plane.

After completing the multi-stage fracture from the fracture ports along the horizontal injection wellbore and equipping the limited entry zonal isolation system, the process brine is injected at a required rate evenly out of the ports to assure complete coverage of the fracture/mining plane. Process brine is injected into the horizontal injection wellbore at a rate greater than the calculated requirement in relation to the fracture width so as to cover the total area which is designed to be developed as a brine field. This allows the injected process brine, at step 110, to dissolve some of the soluble minerals from the deposit thereby forming a mineral solution which also may be referred to as a "pregnant liquor" by those skilled in the art.

While injecting process brine through the limited-entry zonal isolation system, the front of the fractured plane will proceed horizontally in the mineralized bed. It should be noted that the initial fractures may be induced by a multiple stage fracturing event, while secondary fracture propagation occurs from injecting further process solvent through the limited-entry zonal isolation system. The fracture geometry will depend on the in-situ stress regime and the geological environment of the mineralized strata, particularly synsedimentary unconformities, fine-scale sedimentary deposition cycles and linear deformations in the mineral beds caused by tectonic impacts which could be weak but well conveyed and nevertheless result in crystal translation. Because of the geological environment and the induced horizontal multi-stage fracture, the theoretical mining/fracture plane is expected to be rectangular in shape and extend out from the horizontal injector out to the two ultimately provided parallel horizontal production wellbores.

After process brine injection, two generally horizontal production wellbores are drilled, at step 112, on both sides of the injection well such that the production wellbores intersect the mining/fracture plane extending laterally from the injection well. Preferably, the horizontal production wellbores are drilled on both sides of, and generally parallel to, the horizontal injection wellbore at a distance of at least 50 meters from the horizontal injection wellbore in the mineralized bed. The distance between the horizontal production wellbores is preferably greater than 100 meters (50 meters on each side of the horizontal injection well) and less than 1,000 meters (500 meter on each side of the horizontal injection well).

Figure 3A:
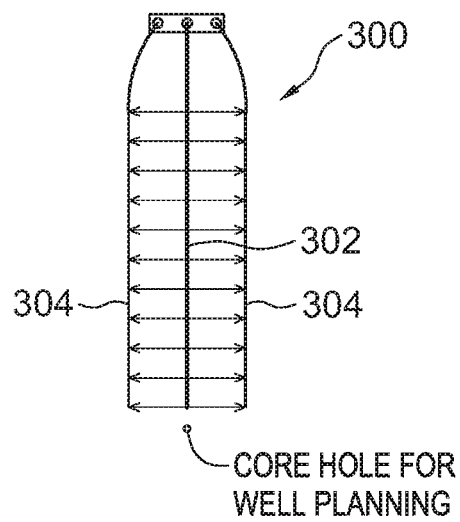
FIG. 3a is a plan view of a horizontal wellbore arrangement that may be employed for the first exemplary method according to the present invention.
Figure 3B:
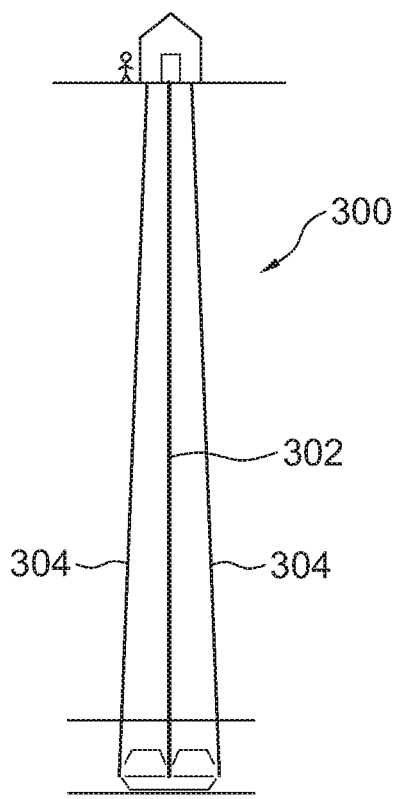
FIG. 3b is a sectional view of a horizontal wellbore arrangement that may be employed for the first exemplary method according to the present invention.

Production wells, comprising the generally horizontal production wellbores, should be directionally drilled to ensure the surface location is as close to, but greater than 25 meters, from the surface location of the horizontal injection well as illustrated in FIGS. 3a and 3b. This ensures that the surface footprint is minimal and is achieved by curving the vertical sections of the production wells so as to move away from the injection well while drilling the vertical and build sections of the horizontal production wellbores.

Figure 3C:
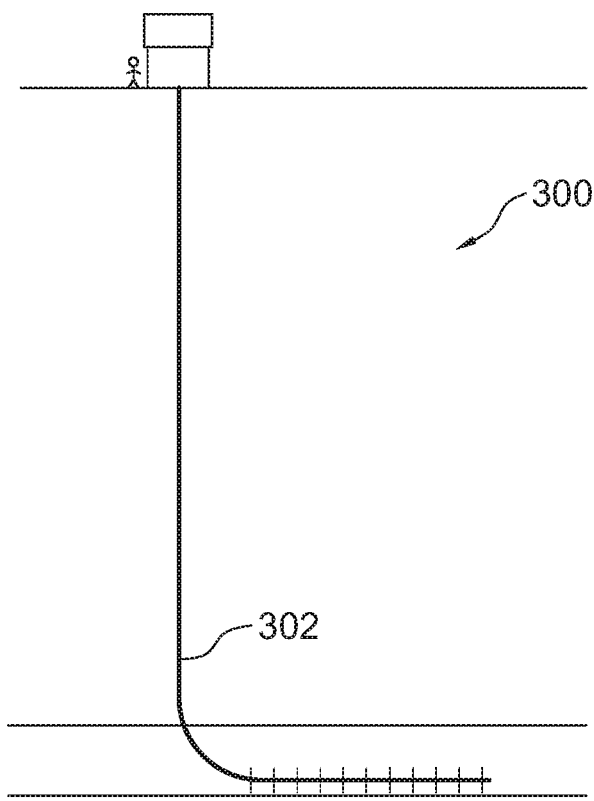
FIG. 3c is an elevation view of a horizontal wellbore arrangement that may be employed for the first exemplary method according to the present invention.

An injection and production well arrangement 300 schematic, resulting from employment of the first exemplary method 100, is shown in FIGS. 3a to 3c. An injection wellbore 302 is shown to be interposed between two production wellbores 304.

The process brine, by virtue of the placement of injection ports, will flow out of the injection wellbore and into and through the mining/fracture plane. The injection pressure can facilitate keeping the mining/fracture plane open and may result in a turbulent flow of the process brine allowing for more circulating activity of the brine. At step 114, the process brine and/or mineral solution flows into the horizontal production wellbores. The process brine and/or mineral solution is then produced to the surface from the horizontal production wellbores, at step 116, via methods known to those skilled in the art. For example, production from the production well can be achieved by solvent injection into the injection well using injection pumps and/or other known pumps installed on the injection or production wells. Production from the producer wells is preferably achieved by the injection pressure alone. However, production may also be achieved by the injection pressure in combination with employing pumps or by employing pumps alone.

It should be noted that in some exemplary embodiments of the present invention akin to that described for the first exemplary method, process brine is provided from an alternative source. It should also be noted that in some exemplary embodiments a mixture of refinery effluent that may be heated and process brine is employed for injection into the horizontal injection wellbore.

It should be also noted that the generally horizontal injection wellbore can be provided in a position that ranges from being perpendicular to or parallel with a mineral deposit's natural fracture direction. Those skilled in the art would be aware on how to position the horizontal injection wellbore relative to a deposit's natural fracture direction so as to optimize creation of large and uniform fracture/mining planes that will ultimately extend from the horizontal injection wellbore.

A second exemplary method according to the present invention is described herein that involves recovering from a subterranean deposit a mineral selected from a group consisting of sylvite and carnallite. The first step of the method is injecting a solvent (which may be process brine), into a generally horizontal injection wellbore, heated either geothermally or by artificial/mechanical means to a temperature equal or higher than the naturally occurring heat of the mineral-bearing stratum. The heated solvent that is injected into the horizontal wellbore that is opened at the base of a deposit containing stratum is then released from the horizontal wellbore through multiple injection points along the horizontal wellbore with sufficient hydraulic pressure so as to create a mining/fracture plane filled by the solvent. A working flow pressure of the injected solvent is maintained in order to create the fracture/mining plane. Preferably after the fracture/mining plane is created and sustained, a desired dissolution pattern created through adjustments in injection pressure, injection rate and injected solvent temperature. Preferably, the solvent is retained in the deposit for a period that allows the solvent to reach saturation of the desired minerals. The (saturated) mineral solution or "pregnant liquor" is recovered from generally horizontal production wells that are in fluid communication with the injection well through the fracture/mining plane.

It should be noted that in some exemplary methods of the present invention akin to that described for the second exemplary method that, instead of employing generally horizontal production wells, the (saturated) mineral solution or "pregnant liquor" is recovered by reducing the solvent injection pressure thereby inducing the flow and recovery of the mineral solution from the outflowing solution or solvent into the horizontal injection wellbore where it is produced from.

These exemplary methods may be repeated until the deposit is substantially exhausted as no more mineral material can be economically recovered.

In some cases, generally horizontal production wells might be provided outside of the fractured plane. This may be a result of the mapping techniques failing to track the propagation of the mining/fracture plane from the horizontal injection wellbore. Preferably, these horizontal production wells are converted into horizontal injection wells, once the central injection mining/fracture plane has been substantially harvested of the economic mineral. The outlying horizontal production wells can be converted into horizontal injection wells by means of multi-stage fracturing at fracture ports and then equipping the well with limited entry zonal isolation tools, akin to those embodiments describe above, so that process brine can be injected out of the fracture ports, causing a new front of a fractured plane that extends outward, in a manner that the migration path can be reasonably forecasted. Preferably, the front of the new fractured plane meets an existing mining/fracture plane in communication with a horizontal wellbore, wherein process brine and/or mineral solution can then be produced to the surface.

Figure 4:
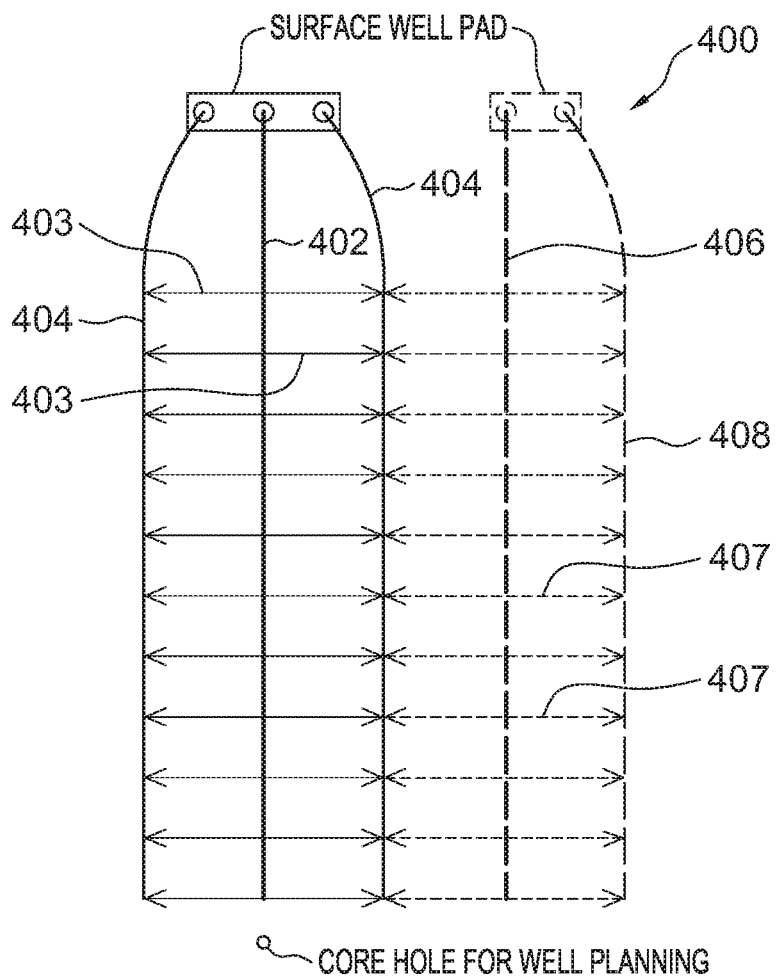
FIG. 4 is a top view of a horizontal wellbore arrangement that may be employed for a third exemplary method according to the present invention.

Turning now to FIG. 4, an injection and production well arrangement 400 resulting from employment of a third exemplary method according to the present invention is illustrated. Initially, the third exemplary method is akin to the first and second embodiments described above, wherein a solvent is injected into a horizontal injection wellbore 402 passing through the deposit and allowed to enter a mining/fracture plane 403, comprising at least one fracture, extending from the generally horizontal injection wellbore 402, at a pressure sufficient to further fracture the deposit, maintain the mining/fracture plane or open the mining/fracture plane. The solvent is allowed to dissolve some of the soluble minerals from the deposit thereby forming a mineral solution which is produced from generally horizontal production wellbores 404 that intersect the mining/fracture plane 403. However, the next stage further involves extending the mining area by providing a new generally horizontal injection wellbore 406 wherein a new mining/fracture plane 407 extending from the new horizontal injection wellbore 406 is created that ultimately intersects with the existing horizontal production wellbore 404. A new generally horizontal production wellbore 408 is then provided such that it intersects with the new fracture/mining plane 407. Operation of the new wellbores and production of the mined mineral solution is akin to the embodiments described above.

It should be noted that according to the present invention, the width, height and direction of the injection front from the horizontal injection well is controlled by the working pressure, material balance and variable pump feeding rates of solvent, thus resulting in a controlled mining system. The controlled mining system may allow for the creation of pillars between the injection points along the horizontal injection wellbore between the various mining/fracture planes that develop during the horizontal line drive selective solution mining process according to the present invention. The pillars are pillar-like structures within the mining stratum that are not dissolved by the injected solvent. The pillars provide support to the mining/fracture plane allowing it remain open and minimize future subsidence.

In some exemplary embodiments, solution mining methods according to the present invention are operated with an adequate working flow pressure and permit the injection of exhausted refinery effluent plus an amount of process brine adjusted to the prevailing ore ratio in the mineable mineral bed. This is because the volume of the exhausted refinery effluent and any added process brine introduced in the refinery system is smaller than the injected amount of refinery effluent plus fresh process brine.

In some exemplary embodiments, roof control may be achieved by injecting a gas or suitable liquid into a horizontal injection wellbore. This allows gas or liquid to enter into a subterranean mining/fracture plane and injection front and to create an effective barrier to protect the roof of a mining/fracture plane from the dissolution action of the solvent. Because gas is more buoyant than brine, it will migrate to the roof of the plane and protect the roof from unwanted dissolution. If a liquid is employed for this purpose, then the density of the liquid must be less than the density of the solvent, so that the liquid will float above the solvent. The advantage of roof control is the possibility of controlling the movement of the mining/fracture plane/zone. The presence of such a barrier gas or liquid has the effect of causing the mining/fracture plane/zone to migrate either in a lateral strike or in the downdip direction.

According to the present invention, the overall pressurized horizontal line drive selective solution mining system, in combination with any solvent or liquid volume that is in excess of the volume required to fill the horizontal mining/fracture plane, weakens progressively the previous fractured plane near the dissolution front, assuring further lateral growth and likely reduced injection pressure over time. This is typically accomplished by pumping process brine out of the injector well at a higher pressure.

The present invention may permit that more sodium chloride than the prevailing equilibrium ratio states will readily be dissolved, or in-situ sodium chloride crystals will loosen and drop to the mining/fracture plane floor, thus exposing new potash crystals that can be dissolved by solvent. While the floor of the mining/fracture plane cavity system will not be dissolved because of the dominating saturated solution in this location, the sides and more efficiently, the roof of the mining/fracture planes will be leached progressively. The dissolution rate is greatest near the horizontal injection wells, along the horizontal injection front, where mining/fracture plane growth is desired. In practice this phenomenon will create a horizontal channel or gallery system that governs the direction the injected solvent or process brine moves through the mining/fracture plane. Even though the contemplated process and application of limited entry mechanical devices will direct the flow of injected solvent or liquid, such solvent or liquid will still follow some preferential flow path, causing basic preferential flow channels or galleries to form. As a result of this, the initial created mining/fracture plane may no longer be plane-like in shape, therefore potentially reducing future subsidence.

It should be noted that the heat content of the solvent used for the present invention may be determined by the relative proportions of the geothermally heated process brine and the cold or cooler exhausted process plant effluent that is adjusted according to the prevailing ore ratio in the mineral bed to be mined. While the heat content of the process brine in most cases is equal to or higher than the one in the deposit, it is apparent that the heat content of the mixture with effluent may be either higher than, or equal to, or lower than the one of the mineral stratum depending on proportions.

Some exemplary embodiments of the present invention may also comprise the following features:

1. Increase the process brine injection pressure and rates to connect separated horizontals wells;
2. Decrease the process brine injection pressure and rates to disconnect connected horizontals wells;
3. Employing gas or non-solvent liquid injection into a horizontal injection wellbore to push the process brine and mineral solution into at least one of the horizontal production wellbores;
4. Detecting the mining/fracture plane and dissolution face by directly observing the effect of solvent dissolution as formed within samples of the in-situ ore body taken by means of drill cores;
5. Recirculating the solvent, whereby once the process brine and mineral solution coming from the production wellbore has been refined and the minerals have been removed, the resulting refinery brine can be mixed with other fluids before being injected downhole;
6. Altering the injection pressure, by back-pumping, to alter a mining/fracture plane from a preplanned plane distribution;
7. Creating mining/fracture plane(s) that will provide enough surface area to start dissolution right away with no need for fresh water or caverns (It should be noted that the mining/fracture plane allows for a large surface area for dissolution to occur. If the surface area is not large enough to start dissolution of the potassium chloride, then fresh water has to be used to dissolve the sodium chloride to expose more potassium chloride for dissolution);
8. Inject process brine at pressure to create turbulent flow in the mining/fracture plane which can facilitate mineral dissolution; and
9. Targeting only the highest grade minerals in the horizontal mining/fracture plane to produce highly saturated brine that can be processed with a mechanical crystallizer.
10. The flow of fluids from the horizontal injection wellbore to the at least one horizontal production wellbore is reversed such that injection occurs in a previous production wellbore and production occurs from a previous injection wellbore.

As will be clear to those skilled in the art, numerous advantages are made possible with the present invention, in the exemplary embodiments presented herein and other embodiments falling within the scope of the present invention as described and claimed. For example, the use of the present invention overcomes the difficulties of potentially employed restricted solution mining techniques that provide access to one mostly potassium-rich stratum penetrated by a single cavity or several inter-connected cavities by introducing a solution mining technique conducted under hydraulic pressure thereby creating more surface area which facilitates dissolution.

Furthermore, the present invention creates a mining/fracture plane that is mined with brine-like fluids and there is no need to create sump using fresh water because the mining/fracture plane provides enough surface area to dissolve the targeted minerals. As the resource minerals are mined, the sodium chloride falls out in the mining/fracture plane allowing for the solvent to become saturated with potassium chloride before being recovered to surface.

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to".

"connected", "coupled", or any variant thereof, means any connection or coupling, either direct or indirect, between two or more elements; the coupling or connection between the elements can be physical, logical, or a combination thereof.

"herein", "above", "below", and words of similar import, when used to describe this specification shall refer to this specification as a whole and not to any particular portions of this specification.

"or", in reference to a list of two or more items, covers all of the following interpretations of the word: any of the items in the list, all of the items in the list, and any combination of the items in the list.

the singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a circuit, module, assembly, device, etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of methods and apparatus have been described herein for purposes of illustration. These are only examples. The invention provided herein can be applied to contexts other than the exemplary contexts described above. Many alterations, modifications, additions, omissions and permutations are possible within the practice of this invention. This invention includes variations on described embodiments that would be apparent to the skilled person, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

The foregoing is considered as illustrative only of the principles of the invention. The scope of the claims should not be limited by the exemplary embodiments set forth in the foregoing, but should be given the broadest interpretation consistent with the specification as a whole.

The invention claimed is:

1. A method for mining soluble minerals from a subterranean deposit, the method compromising the steps of:

providing a generally horizontal injection wellbore passing through the deposit;

fracturing the deposit generally horizontally from the horizontal injection wellbore thereby creating fractures initiating from the horizontal injection wellbore and extending in at least one transverse direction to the horizontal injection wellbore creating a mining/fracture plane, comprising at least one fracture in the plane, extending from the horizontal injection wellbore into the deposit;

injecting a first fluid into the horizontal injection wellbore and allowing the injected first fluid to enter the mining/fracture plane from the horizontal injection wellbore at a pressure sufficient to propagate the factures generally horizontally and further through the mining/fracture plane;

allowing the injected first fluid to dissolve some of the soluble minerals from the deposit thereby forming a mineral solution;

providing at least one generally horizontal production wellbore passing through the deposit that is substantially parallel with the horizontal injection wellbore at a location such that the at least one horizontal production wellbore intersects the fractures extending from the horizontal injection wellbore through the mining/fracture plane, thereby rendering the at least one horizontal production wellbore in fluid communication with the horizontal injection wellbore;

allowing the mineral solution to flow through the mining/fracture plane and flow into the at least one horizontal production wellbore; and producing the mineral solution from the at least one horizontal production wellbore.

2. The method of claim 1 wherein the at least one transverse direction is generally perpendicular to the horizontal injection wellbore.

3. The method of claim 1 wherein the at least one transverse direction comprises only two generally opposing directions initiating from the horizontal injection wellbore.

4. The method of claim 3 wherein the at least one horizontal production wellbore comprises two horizontal production wellbores such that the horizontal injection wellbore is interposed between the two horizontal production wellbores.

5. The method of claim 1 wherein the mining/fracture plane is generally horizontally oriented.

6. The method of claim 1 wherein the fractures initiate from a first plurality of ports spaced along a length of the horizontal injection wellbore.

7. The method of claim 6 wherein the step of fracturing comprises injecting a second fluid into the horizontal injection wellbore and allowing the injected second fluid to enter the deposit from the first plurality of ports at a pressure sufficient to fracture the deposit.

8. The method of claim 7 wherein at least one of: the first fluid; and the second fluid, is at a temperature higher than the deposit temperature.

9. The method of claim 7 wherein at least one of: the first fluid; and, the second fluid, is pre-heated by non-geothermic, geothermic artificial/mechanical and/or mechanical means before injection.

10. The method of claim 7 wherein at least one of: the first fluid and/or the second fluid is injected under hydraulic pressure.

11. The method of claim 7 wherein the second fluid is the first fluid.

12. The method of claim 7 wherein the first fluid is selected from the group consisting of; fluids derived from subterranean sources; naturally occurring brackish to saline water; refinery plant effluent brine; exhausted refinery effluent; fluids from subterranean sources located close to or at a stratum of embedded soluble minerals; fluids derived mainly from a subterranean source located under the stratum of embedded soluble minerals; fluids derived mainly from a subterranean source located above the stratum of embedded soluble minerals; under-saturated salt solution, and brine and recovered brine.

13. The method of claim 6 wherein the step of allowing the injected first fluid to enter the mining/fracture plane initiates from a second plurality of ports spaced along a length of the generally horizontal injection wellbore.

14. The method of claim 13 wherein the first plurality of ports and the second plurality of ports are the same.

15. The method of claim 1 wherein the mining/fracture plane is generally rectangular in shape.

16. The method of claim 1 wherein the soluble minerals comprise chloric, nitric and sulphate minerals, Sylvie, or carnallite.

17. The method of claim 1 further comprising after providing the least one generally horizontal production wellbore passing through the deposit, continuing to inject the first fluid into the horizontal injection wellbore at sufficient pressure to maintain the fractures in the mining/fracture plane open to allow the mineral solution to flow through the mining/fracture plane and be produced from the at least one production wellbore.

* * * * *

UNITED STATES PATENT AND TRADEMARK OFFICE
CERTIFICATE OF CORRECTION

PATENT NO. : 11,073,008 B2
APPLICATION NO. : 16/370589
DATED : July 27, 2021
INVENTOR(S) : Quinton Hardage and Stephen Philip Halabura Page 1 of 1

It is certified that error appears in the above-identified patent and that said Letters Patent is hereby corrected as shown below:

In the Claims

Claim 16, Column 13, Line 21, after "minerals" and before "or carnallite", replace "Sylvie" with -- sylvite --.

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*